Patented May 8, 1928.

1,668,964

UNITED STATES PATENT OFFICE.

GEORGES IMBERT, OF MANCHESTER, ENGLAND, ASSIGNOR TO BRITISH DYESTUFFS CORPORATION LIMITED, OF LONDON, ENGLAND, A CORPORATION OF GREAT BRITAIN AND IRELAND.

PROCESS FOR THE MANUFACTURE OF PHENYL GLYCINE OR COMPOUNDS THEREOF.

No Drawing. Application filed October 26, 1920, Serial No. 419,644, and in Great Britain July 2, 1920.

It is known that phenyl glycine compounds can be made from trichlorethylene by using dichlor-vinyl-ethyl ether which is made by heating trichlorethylene with an alcoholic solution of sodium ethylate. The dichlor-vinylethyl ether thus obtained is transformed into chloracetic ester, or chlor acetic acid, which compounds brought into reaction with aniline give the phenyl glycine compounds.

I have discovered a new process for manufacturing phenyl glycine compounds from trichlorethylene and aniline without isolating any intermediates, and without using alcohol as solvent.

The reactions described below are quite new and no similar reactions are known.

I found that by heating trichlorethylene or tetrachlorethane in aqueous solution with aniline and alkali metal hydroxides, carbonates, silicates, aluminates, zincates and other similar alkali metal salts, or the hydroxides of the alkali earth metals, phenyl glycine compounds are formed in a single technical operation without the necessity of separating any intermediate bodies occuring. Further, I found that in addition to the phenyl glycine compounds formed in the reaction, other bodies of different constitution are formed. All these bodies can be transformed into phenyl glycine derivatives, by heating them further with alkali metal hydroxides or similar alkaline bodies as mentioned above. Thus I isolated a base formed from one molecule trichlor-ethylene with three molecule aniline which on heating with alkali metal hydroxides gives one molecule phenyl glycine alkali metal salt and two molecules of aniline. Thus the final products of all reactions going on are phenyl glycine derivatives.

The process may be illustrated by the following examples—

*Example 1.*

Trichlorethylene (132 kilos) water (500 kilos) aniline (186 kilos) are heated in an autoclave at about 130° C. and 480 kilos of sodium hydroxide solution (33.3%) are pumped into the autoclave during six hours. After this time the excess of aniline is distilled off and the phenyl glycine isolated.

*Example 2.*

Trichlorethylene (132 kilos) water (1200 kilos) aniline (280 kilos) sodium carbonate (200 kilos) are heated for 10 hours to about 130° C. The carbon-dioxide developed is allowed to flow out of the autoclave from time to time through a condenser, thus any aniline and trichlorethylene distilling over are recovered. At the end of 10 hours, the aniline in excess is distilled over and the phenyl glycine isolated.

*Example 3.*

Trichlorethylene (132 kilos) water (1000 kilos) aniline (300 kilos) lime CaO (100 kilos) are heated for 6 hours to 170° C. After this time the excess of aniline is distilled over. The product obtained, which consists of phenyl glycine anilide and calcium salt of phenyl glycine, is converted into the alkali metal salt of phenyl glycine by heating with alkali metal hydroxides under pressure.

What I claim as my invention and desire to secure by Letters Patent is:—

1. The process of manufacturing phenyl glycine compounds which comprises heating an aqueous solution of aniline and an alkaline body with a substance selected from the group consisting of trichlorethylene and tetrachlorethane.

2. In the process of manufacturing phenyl glycine, the step which consists in heating trichlorethylene in aqueous solution with aniline and an alkaline body.

3. The process of manufacturing phenyl glycine which consists in heating trichlorethylene, water, aniline and sodium hydroxide solution at a temperature of about 130° C, substantially as described.

In witness whereof I have hereunto set my hand.

GEORGES IMBERT.